(12) United States Patent
Niehaus et al.

(10) Patent No.: US 7,598,637 B2
(45) Date of Patent: Oct. 6, 2009

(54) STATOR FOR AN ELECTRICAL MACHINE

(75) Inventors: Udo Niehaus, Schonungen (DE); Alexander Gehring, Hassfurt (DE); Manfred Zimmer, Zeil (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 256 days.

(21) Appl. No.: 11/801,898

(22) Filed: May 11, 2007

(65) Prior Publication Data

US 2007/0262664 A1 Nov. 15, 2007

(30) Foreign Application Priority Data

May 11, 2006 (DE) .................. 10 2006 021 898

(51) Int. Cl.
*H02K 11/00* (2006.01)
(52) U.S. Cl. .................. 310/71; 310/254; 310/208; 310/194
(58) Field of Classification Search .................. 310/71, 310/179, 194, 208, 254, 260
See application file for complete search history.

(56) References Cited

U.S. PATENT DOCUMENTS

| 5,828,147 | A | * | 10/1998 | Best et al. ..................... 310/71 |
|---|---|---|---|---|
| 6,369,473 | B1 | | 4/2002 | Baumeister et al. |
| 6,600,244 | B2 | * | 7/2003 | Okazaki et al. ............... 310/71 |
| 6,617,719 | B2 | * | 9/2003 | Sunaga et al. ................. 310/64 |
| 6,707,186 | B2 | * | 3/2004 | Oppitz ........................ 310/71 |
| 6,856,057 | B2 | * | 2/2005 | Kobayashi et al. ............ 310/71 |
| 6,894,410 | B2 | * | 5/2005 | Kobayashi et al. ............ 310/71 |
| 7,116,023 | B2 | * | 10/2006 | Wang et al. ................... 310/71 |
| 7,514,828 | B2 | * | 4/2009 | Vollmuth et al. .............. 310/71 |
| 2003/0173841 | A1 | * | 9/2003 | Kobayashi et al. ............ 310/71 |
| 2005/0189828 | A1 | * | 9/2005 | Nakayama et al. ............ 310/71 |
| 2006/0138883 | A1 | * | 6/2006 | Yagai et al. ................... 310/71 |
| 2006/0208585 | A1 | * | 9/2006 | Vollmuth et al. .............. 310/71 |
| 2007/0080592 | A1 | * | 4/2007 | Ohta et al. .................... 310/71 |

* cited by examiner

*Primary Examiner*—Thanh Lam
(74) *Attorney, Agent, or Firm*—Cohen Pontani Lieberman & Pavane LLP

(57) ABSTRACT

A stator for an electrical machine includes a ring-shaped stator yoke with a number of stator coils arranged thereon. The conductor ends of the coils are designed to be connected to a wiring arrangement, where the wiring arrangement has linking conductors, which are arranged concentrically to each other, are insulated electrically against each other, and have terminal elements to form electrical contact areas by which they are connected to the ends of the stator coils. The ends of the coils be connected to the linking conductors by separate terminal elements which have a first contact area for establishing a connection with the linking conductor and a second contact area for establishing a connection with at least one coil end.

13 Claims, 5 Drawing Sheets

STATOR FOR AN ELECTRICAL MACHINE

BACKGROUND OF THE INVENTION

1. Field of the Invention

The present invention pertains to a stator for an electrical machine with a ring-shaped stator yoke having a plurality of stator coils arranged thereon, the stator coils having conductor ends electrically connected to linking conductors concentrically arranged and electrically insulated from each other.

2. Description of the Related Art

Stators for electrical machines are known which include a stator yoke with a plurality of stator teeth and electrical windings in the form of, for example, individually wound stator coils of insulated wire, arranged on each of the teeth. The two conductor ends of each coil are assigned to individual strands, and the coils are connected to each other in a predetermined manner by common linking conductors. In the case of a three-phase machine, the stator has three strands and thus at least three linking conductors, each of which is supplied with current with a phase offset of 120°. The linking conductors are wired to a switch box so that the electrical machine can be connected to power supply equipment.

U.S. Pat. No. 6,369,473 discloses a stator for an electrical machine in which a wiring arrangement has electrically insulated linking conductors which are arranged concentrically to each other. The terminals which accept the ends of the stator coils are in the form of projections extending from the linking conductors. For each coil end, a separate terminal projection is provided, and as a result of the radial staggering of the linking conductors thus realized here, the connecting points are also in different radial positions. The electrical connections can be realized here by a joining technique such as welding or soldering and/or by simply winding the wire around the terminal projection. The linking conductors are supported against each other and against the stator by interposed strips of insulating material.

The figures of U.S. Pat. No. 6,369,473 described above show that the linking conductors have a very complicated design and that a correspondingly large number of production steps are required to produce the linking conductors and their connections.

SUMMARY OF THE INVENTION

An object of the present invention is to provide a stator having a wiring arrangement that is simpler to manufacture and which overcomes the problems of the prior art stators.

The object of the present invention is met by an embodiment comprising a stator having a ring-shaped stator yoke and a plurality of stator coils arranged on the stator yoke. Ends of the conductors of the stator coils are electrically connected to linking conductors which are arranged concentrically to each other and insulated electrically from each other. The coil ends are connected to the linking conductors by separate terminal elements which have a first contact area for establishing a connection with the linking conductors and a second contact area for establishing a connection with at least one coil end.

This embodiment of the inventive stator provides the advantage that the linking conductors require no special structural design at least in the area of the coil connection points and instead have an essentially constant cross section over their entire length. In a particular embodiment, the linking conductors are designed with an essentially constant cross-sectional shape. This means that even a simple rectangular, flat strip-like, or round conductor available for purchase as a standard item can be used as the linking conductor. For this purpose it is necessary only to cut the conductor elements to the desired length, to bend them into the proper shape, possibly to form the terminal areas for establishing the connection of the stator to power supply equipment, and finally to mount these conductors on the stator.

For the purpose of connecting the stator to power supply equipment, it is advantageous in this context to use separate bus bars, which can be connected to the linking conductors. Thus the amount of work required to produce the linking conductors is further reduced with respect to the prior art. The additional advantage is also obtained in that the stator is connected to the power supply equipment by a configuration that can be selected independently of the geometry of the linking conductors and is no longer predetermined by the design of the linking conductors.

In accordance with another embodiment of the invention, it is also extremely advantageous with respect to production technology for the contact areas of the coil ends with the wiring arrangement to be located in a common axial and radial position. As a result, the contacting operation can be carried out automatically by a stationary tool while the stator is supported with freedom to rotate around a center axis without the need for any additional radial feed movements. A considerable increase in productivity can be achieved when the end of one coil and the circumferentially adjacent end of a second coil are assigned to one and the same linking conductor by means of a common terminal element. This means that, per joining operation, two coil ends are connected simultaneously, as a result of which considerable amounts of time and money are saved in the production of a stator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references denote similar elements throughout the several views.

DETAILED DESCRIPTION OF THE PRESENTLY PREFERRED EMBODIMENTS

Figure 1:
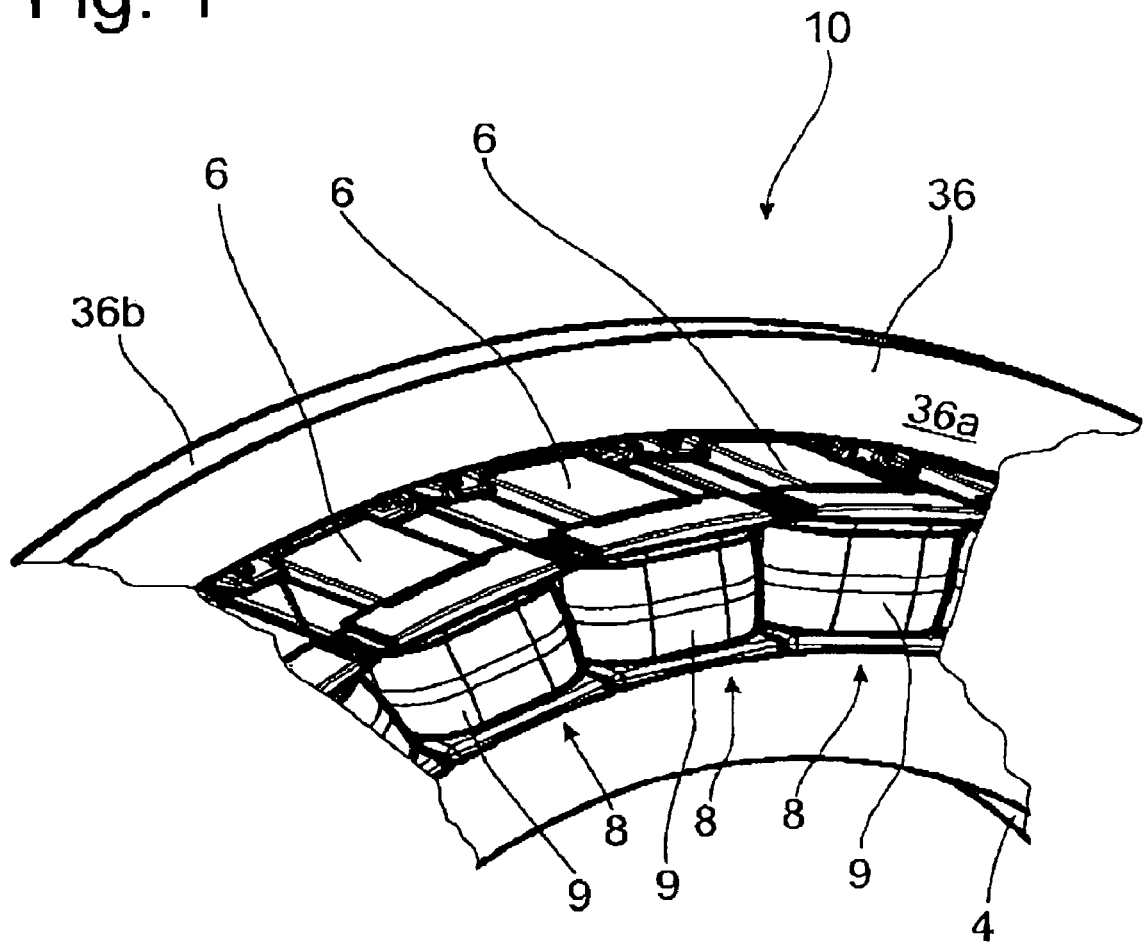
FIG. 1 is a partial perspective view of a stator equipped with individual coils and with a support structure of a wiring arrangement according to an embodiment of the present invention.
Figure 2:
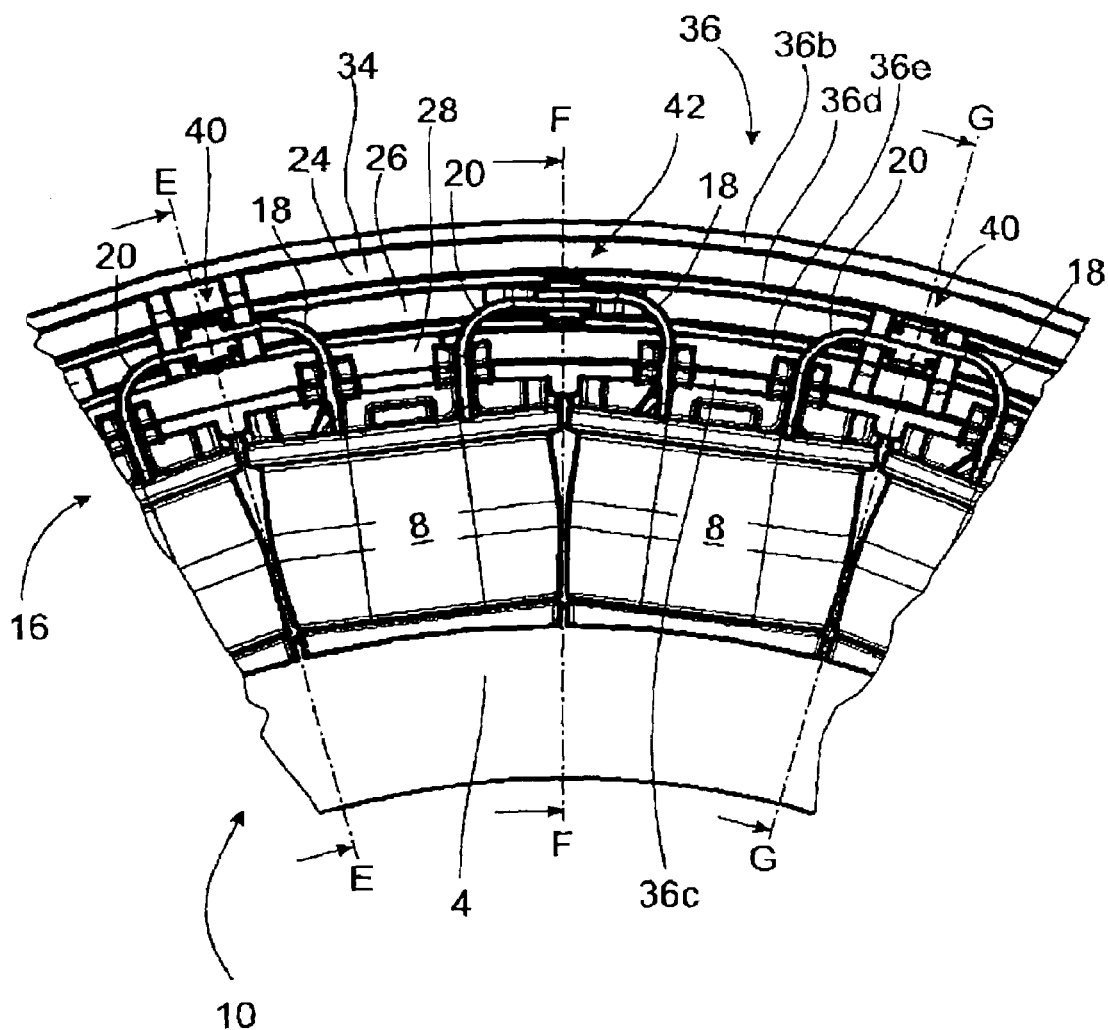
FIG. 2 is a partial side view of the stator according to FIG. 1 showing the wiring side of the stator.
Figure 3:
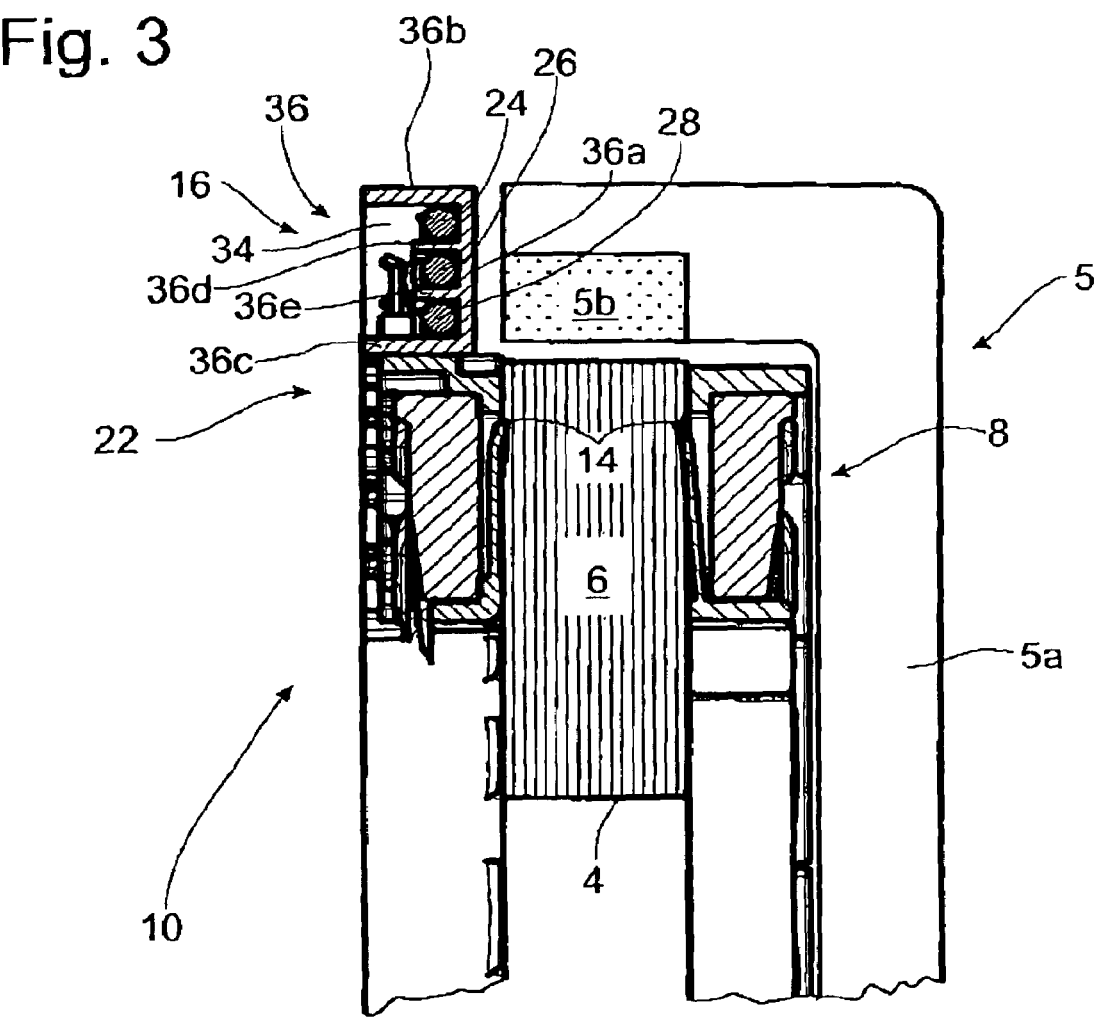
FIG. 3 is a cross sectional of an electrical machine with a stator according to FIGS. 1 and 2 with a wiring arrangement.

FIGS. 1-3 show part of a stator 10 for an electrical machine (not shown) with a ring-shaped stator yoke 4 consisting of electric steel laminations and with a rotor 5 (the rotor 5 is schematically indicated in FIG. 3) having a rotor carrier 5a and permanent magnets 5b. The stator of FIGS. 1-3 is designed for a synchronous electrical machine of the external rotor type excited by permanent magnets. However, the specific design of the electrical machine is irrelevant to the following explanation. The machine could be, for example, an induction motor, a reluctance machine of the internal, external, or disk rotor type, or any other type of electrical machine. The stator yoke 4 has a number of radially outward-oriented teeth 6 distributed uniformly around the circumference. Each tooth 6 carries an individual coil 8. Only three or four coils adjacent to each other on the stator are shown in the figures to facilitate a description of the wiring arrangement. The coils 8 include windings 9 of a single or multi-strand conductor. It is advantageous for the individual conductors to be twisted around each other.

Figure 4:
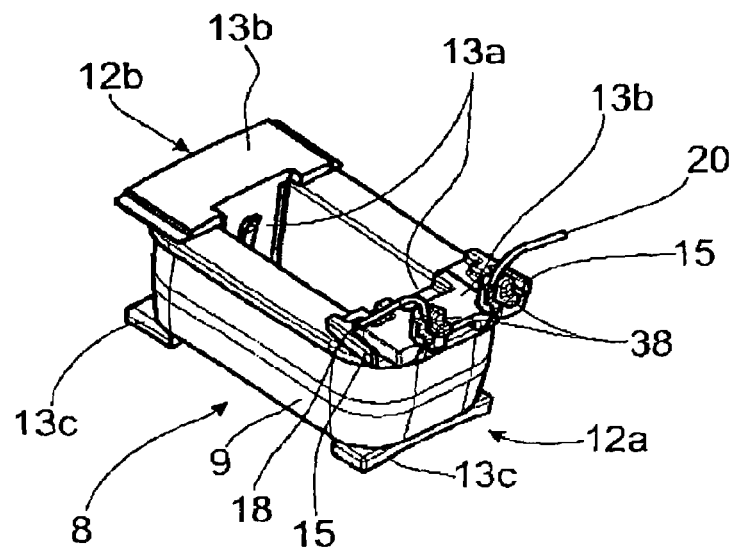
FIG. 4 is a perspective view of an individual coil wound on two winding bodies for installation on a stator according to FIGS. 1-3.

As shown in FIG. 4, each individual coil 8 has first been wound separately in a preceding production step on two winding bodies 12a, 12b made of insulating material, and then pushed onto a tooth 6 of the stator yoke 4. The coil 8 is secured against slipping by a latching connection 14. Each of the winding bodies 12a, 12b comprises a base area 13a, which rests on the stator yoke 4, and two sidepieces 13b, 13c, which project out at an angle of approximately 90° and which form the boundaries of the winding area in the radial direction. Referring back to FIGS. 1-3, each coil 8 has two conductor ends 18, 20, which extend out from the coil 8 in the radially outward direction at a common end surface 22 of the stator 10 and are thus available for wiring and the formation of a wiring arrangement 16. The coils 8 are assigned to individual strands and, as will be explained in greater detail below, are wired together in a predetermined manner by the use of common linking conductors 24, 26, 28. In the exemplary embodiment explained here, the coils 8 are wired in the manner of a delta connection. However, the type of connection is irrelevant to the following explanations. That is, as an alternative, an additional linking conductor could be used to make a wye connection, or some other type of wiring could be realized. In the embodiment disclosed in FIGS. 1-3, the linking conductors 24, 26, 28 are designed as round copper conductors, which have been bent into open or closed rings. The cross section of each of these conductors is essentially constant over its length. Instead of having a round cross-section, the conductors 24, 26, 28 may have a rectangular, or flat strip-like cross section, or any other cross-sectional shape.

As clearly depicted in FIGS. 2 and 3, the linking conductors 24, 26, 28 are arranged in a receiving space 34 of a support structure 36 mounted on the stator 10 and designed as a separate plastic ring. The plastic ring 36 is pushed axially over the teeth 6 of the stator yoke 4. Latching elements 15 formed on the winding bodies 12a, 12b permanently latch the plastic ring 36 to the stator on a mounting surface formed jointly by the radially outer sidepieces 13b of the winding bodies 12a, 12b.

Thus the support structure 36 with the linking conductors 24, 26, 28 is located both radially and axially outside the stator yoke 4 but radially on the same level as the rotor 5 and axially immediately adjacent to the rotor 5.

As an alternative to the arrangement variant of the support structure 36 described above, the linking conductors 24, 26, 28 may also be arranged radially inside the stator yoke 4 and/or axially immediately adjacent to it.

Figure 6A:
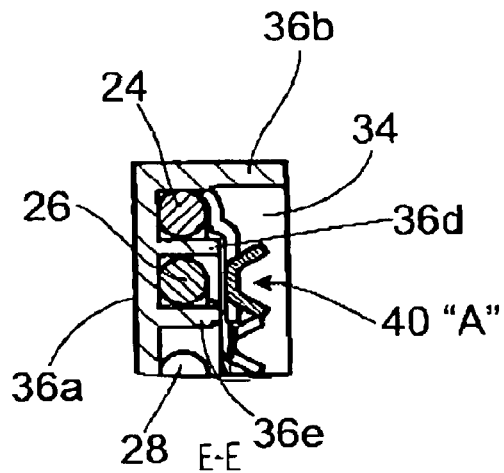
FIGS. 6a-c are cross sectional views of the stator in FIG. 2.
Figure 6B:
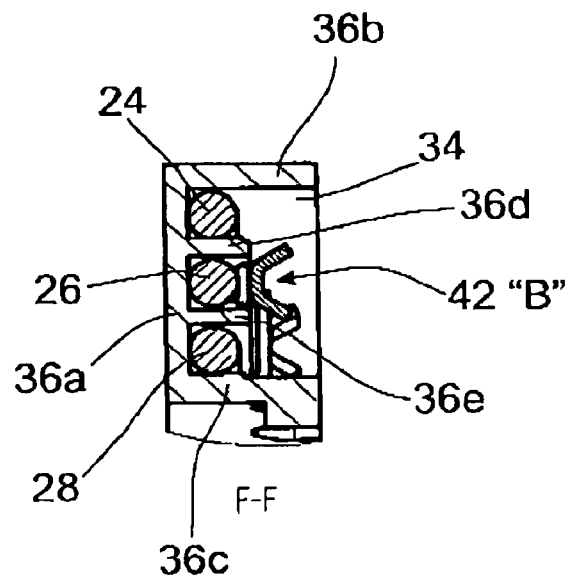
Figure 6C:
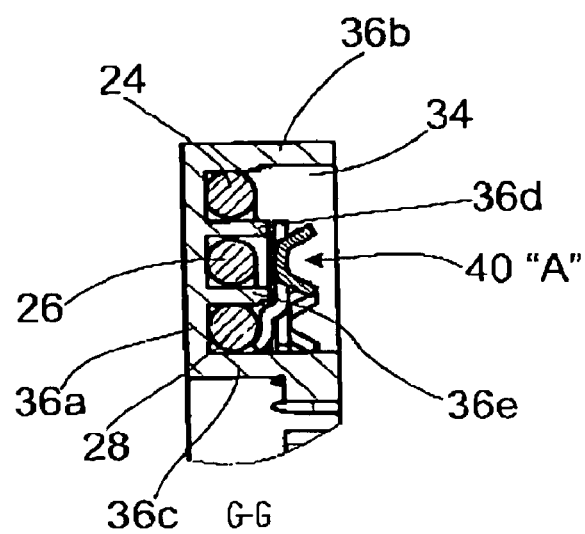

The receiving space 34 of the support structure 36 is a groove open on one side with a base 36a and two walls 36b, 36c projecting at right angles from the base. The receiving space 34 is divided by separating webs 36d into several radially separate areas so that the linking conductors 24, 26, 28 are arranged separately. In this case, two separating webs 36d, 36e, which are designed here as partition walls, are provided for the three linking conductors 24, 26, 28. As an alternative, it is also possible for the separating webs 36d, 36e to be designed as pins a certain distance apart or as relatively short wall areas a short distance apart in the circumferential direction. The separating webs 36d, 36e can be easily integrated into the support structure 36 during the course of production by injection-molding. It is obvious from FIG. 6 that the separating webs 36d, 36e project slightly beyond the linking conductors 24, 26, 28 and that the groove walls 36b, 36c are somewhat higher than the separating webs 36d, 36e.

FIG. 2 shows that the end 18 of one coil 8 and the end 20 of the adjacent coil 8 are electrically connected jointly to one of the linking conductors 24, 26, 28. The winding bodies 12a have wire guide sections 38 projecting into the support structure 36, so that the ends 18, 20 of the coils can be led to the linking conductors 24, 26, 28, and so that the contact between the linking conductors 24, 26, 28 and the ends 18, 20 of the coils can be established inside the receiving space 34. For this purpose, separate terminal elements 40, 42, 44, 46 are provided, as shown in FIGS. 5a, 5b, 5c, 5d which have a first contact area for establishing a connection with the linking conductors 24, 26, 28 and a second contact for establishing a connection with the ends 18, 20 of the coils. In the exemplary embodiments being explained here, the terminal elements 40, 42, 44, and 46 are stamped out of sheet metal, preferably copper sheet, and pre-bent into shape.

Figure 5A:
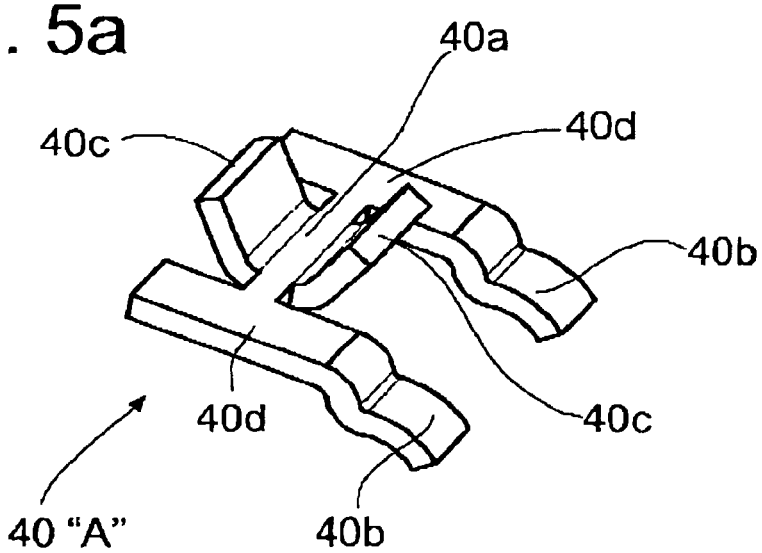
FIGS. 5a-d are perspective views of terminal elements for connecting the ends of the coils to the linking conductors in the stator of FIGS. 1-3.
Figure 5B:
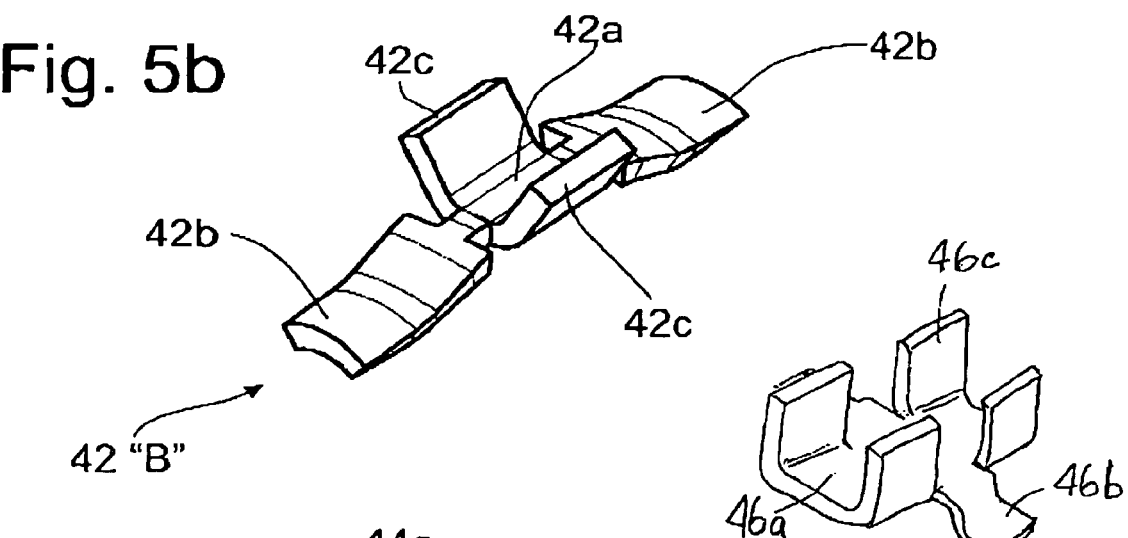
Figure 5D:
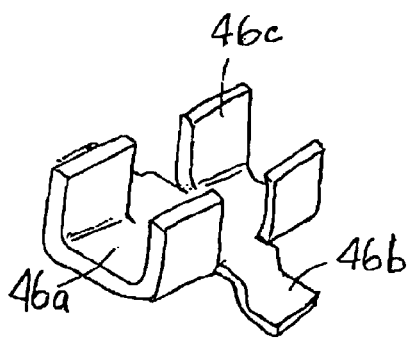

So that the stator 10 can be wired in the manner shown in FIG. 2, two different types of terminal elements 40 (type "A"), 42 (type "B") according to FIGS. 5a and 5b are used, each having a first contact area for establishing a connection with one of the linking conductors 24, 26, 28 and a second contact area for establishing a connection with the ends 18, 20 of the coils. The terminal elements 40, 42 differ with respect to the design of the first contact areas. The second contact areas of terminal elements 40, 42 are essentially the same. The type A terminal element 40 in FIG. 5a has a base body 40a with two laterally projecting lugs 40b, which form the first contact areas. Both of the lugs 40b in the type A terminal element 40 project in the same transverse direction relative to the length of the base body 40a. The type B terminal element 42 in FIG. 5b has a base body 40b with projecting lugs 42b. The lugs 42b of the type B terminal element 42 project from the base body 42a in opposite directions along a direction parallel to the length of the base body 42a.

The terminal elements 40, 42 have, as second contact areas, clamping sections 40c, 42c, which project from the base bodies 40a, 42a. In the type A terminal element 40, the clamping sections 40c extend in the same direction as the lugs 40b, i.e., laterally. In the type B terminal element 42, the clamping sections 42c extend in the direction perpendicular to the lugs 42b.

The lugs 42b of the terminal element of type B terminal element 42 are designed to be connected to the middle linking conductor 26 by spot welding or soldering. The base body 42a is bent outward from the lugs 42b away from the middle linking conductor 26 and the clamping sections 42c are both bent upward from the plane of the base body 42a to form a "V" to accept one end 18, 20 of a coil.

The type A terminal elements 40 are arranged pointing in opposite directions, one with lugs 40b on the radially outer linking conductor 24 and one with lugs 40b on the radially inner linking conductor 28. The lugs 40b projecting from the base body 40a are again connected to the linking conductor, for example, by spot welding or soldering. The lateral areas 40d of the base body 40a of the type A terminal elements 40 adjacent to the lugs 40b rest on the two separating webs 36d, 36e of the support structure. The extra height of the separating webs 36d, 36e above the middle linking conductor 26 prevents unintentional contact and thus a short-circuit between the terminal element 40 and the middle linking conductor. The axial intermediate space formed between the linking conductor 26 and the terminal elements 40 is, in a subsequent step, filled up with an insulating material such as a casting compound. The clamping sections 40c of the type A terminal elements 40 thus arrive in a position relative to the stator 10 which lies on the same reference circle diameter and in the same plane as the clamping sections 42c of the type B terminal elements 42.

So that the coil ends 18, 20 emerging radially from the coils 8 can be brought into contact with the second contact areas of the base sections 40a; 42a, they are first bent over so that they extend tangentially and then guided in the same direction as the linking conductors 24, 26, 28 to the second contact areas of the base sections 40a; 42a. The ends 18, 20 are then laid in the receiving space formed between the clamping sections 40c; 42c. The clamping sections 40c; 42c are then squeezed together, thus enclosing each adjacent pair of the coil ends 18, 20 and securely holding them in place on the linking conductors 24, 26, 28.

Figure 5C:
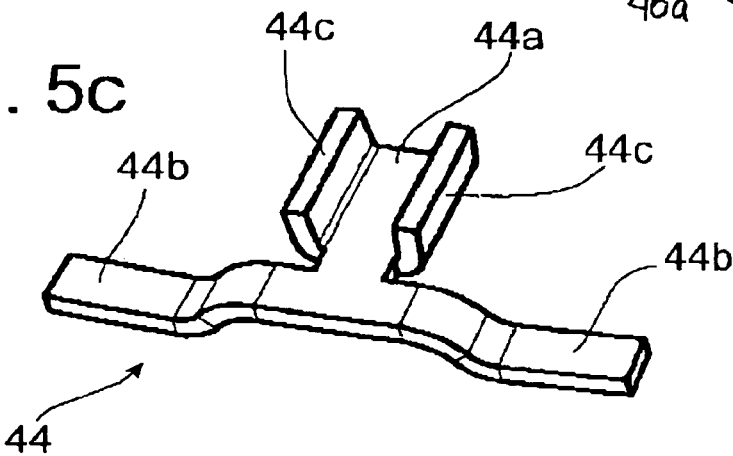

Instead of the illustrated tangential orientation of the coil ends 18, 20 and of the second connecting areas formed by the base areas 40a, 42a, the coil ends 18, 20 and areas may alternatively extend in the radial direction on the stator 10, for which purpose a terminal element 44 shown in FIG. 5c can be used to establish the connection with the radially inner or radially outer linking conductors 24, 28. This terminal element has two lugs 44b aligned with the linking conductors 24, 28 and connected to them. A base body 44a projects at a right angle from the lugs 44b. Two clamping sections 44c extend upward from the base body 44a to receive the coil ends 18, 20. Upon installation on the support structure 36, the base body 44a may rest on the separating webs 36d, 36e. For the connection to the middle linking conductor 26, an additional terminal element 46 (FIG. 5d) is used, which, for example, has merely a base body 46a with clamping sections 46c. By making two cuts in each clamping section 46c, segments 45b can be bent outward until they are parallel to the linking conductor 26 so that they can then be connected to it.

As previously mentioned, the groove walls 36b, 36c are higher than the separating webs 36d, e. The extent of the projection is such that the first and second contact areas are inside the receiving space 34. Instead of a crimped or squeezed connection, the coil ends 18, 20 could also be soldered, of course, or welded, or fixed in place on the terminal elements 40, 42, 44 by some similar method.

FIG. 2 shows that the terminal elements 40, 42 are located circumferentially between the adjacent ends 18, 20 of different coils 8, and that the end 18 of one coil 8 and the end 20 of the adjacent coil are assigned to one and the same linking conductor 24, 26, 28 by a common terminal element 40, 42. As a result, all of the second contact areas of the terminal elements 40, 42, i.e., the base areas 40a, 42a, connected to the various linking conductors 24, 26, 28 are located in a common axial and radial position, where first the inner 24, then the middle 26, and finally the outer linking conductor 28 are contacted in sequence by a terminal element 40, 42. The arrangement just described offers the advantage that the two coil ends 18, 20 assigned to one terminal element 40, 42 can be electrically connected simultaneously, in a single step, to this terminal element.

In FIG. 2, the terminal elements 40, 42 are depicted as located centrally between the two ends 18, 20 of the coils. According to another embodiment, the terminal elements 40, 42 may be positioned as close as possible to one of the coil ends 18, 20 and for the other coil end 18, 20, which is thus somewhat longer, to be held in place on the winding body 12a or on the support structure 36 and guided in the circumferential direction in, for example, a conductor channel. Thus mechanically stabilized, this end 18, 20 can then be safely brought to the terminal element 40, 42.

In a further embodiment of the invention, the receiving space 34 is completely filled with a sealing compound such as a resin or silicone to protect the linking conductors 24, 26, 28, the terminal elements 40, 42, and their contact areas from corrosion and to increase the strength of the wiring arrangement 16. The linking conductors 24, 26, 28 and the first and second contact areas will thus be completely encapsulated and protected from the environment.

As an alternative to the support structure 36 manufactured as a separate ring, the support structure 36 may also be made up of individual segments. For example, appropriate structures can be formed on the radially inward or radially outward side of the winding bodies 12a, so that, after all of the coils 8 have been mounted on the stator 10, the individual structures form a closed ring, in which linking conductors 24, 26, 28 can be installed.

So that the stator 10 can be connected to power supply equipment, the linking conductors 24, 26, 28 are connected to three bus bars (not shown), which are introduced into a terminal box, where they can be connected by electrical cables to a current source. The bus bars can also be cast or embedded in an insulating material.

Of course, the radially aligned arrangement of the linking conductors 24, 26, 28 on the stator 10 is not mandatory either. That is, when it appears advisable, these conductors can also be arranged with an axial offset from each other, in which case the principle by which the wiring is accomplished can still be applied.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

What is claimed is:

1. A stator for an electrical machine, comprising:
   a ring-shaped stator yoke;
   a plurality of stator coils arranged on said yoke, each of said stator coils having a winding with coil ends;
   linking conductors arranged concentrically to each other and insulated electrically from each other; and
   terminal elements connecting said coil ends to the linking conductors, each of said terminal elements comprising a first contact area for establishing a connection with one of the linking conductors and a second contact area for establishing a connection with at least one of the coil ends.

2. The stator of claim 1, wherein said linking conductors are connected to bus bars for connecting the stator to power supply equipment.

3. The stator of claim 1, wherein each of the linking conductors is connected to at least one of the terminal element, wherein the second contact areas of each of the terminal elements connected to the different linking conductors are arranged in a substantially common axial and radial position relative to the stator and wherein one end of one of the coils and another end of an adjacent one of the coils are assigned to the same linking conductor by a common one of the terminal elements.

4. The stator of claim 1, wherein each of said linking conductors has a substantially constant cross section.

5. The stator of claim 1, wherein each of said terminal elements are located circumferentially between adjacent ones of the coils.

6. The stator of claim 1, further comprising a support structure on the stator defining a receiving space, said linking conductors being located in said receiving space said support structure.

7. The stator of claim 6, wherein said receiving space is designed as a groove open on one side having a base and walls.

8. The stator of claim 7, further comprising separating webs arranged in said receiving space to separate the linking conductors.

9. The stator of claim 8, wherein said separating webs project from said base beyond the linking conductors.

10. The stator of claim 8, wherein said groove walls project from the base beyond the separating webs.

11. The stator of claim 6, wherein said first and second contact areas of said terminal elements are formed inside said receiving space.

12. The stator of claim 8, wherein said terminal elements are supported against said separating webs.

13. The stator of claim 6, further comprising a sealing compound sealing said receiving space.

* * * * *